United States Patent [19]
Nakamura et al.

[11] Patent Number: 5,940,157
[45] Date of Patent: Aug. 17, 1999

[54] LIQUID CRYSTAL DISPLAY PANEL

[75] Inventors: Koji Nakamura, Tokai; Takayuki Fujikawa, Okazaki, both of Japan

[73] Assignee: Denso Corporation, Kariya, Japan

[21] Appl. No.: 08/953,630

[22] Filed: Oct. 17, 1997

[30] Foreign Application Priority Data

Oct. 18, 1996  [JP]  Japan .................................... 8-276330

[51] Int. Cl.$^6$ ...................... G02F 1/1339; G02F 1/1337
[52] U.S. Cl. ...................... 349/156; 349/110; 349/123; 349/138; 349/174
[58] Field of Search ................................. 349/123, 110, 349/111, 156, 155, 138, 33, 172, 174; 345/87

[56] References Cited

U.S. PATENT DOCUMENTS

| | | |
|---|---|---|
| 4,720,173 | 1/1988 | Okada et al. . |
| 5,644,371 | 7/1997 | Koden et al. ............................ 349/110 |
| 5,828,434 | 10/1998 | Koden et al. ............................ 349/156 |

FOREIGN PATENT DOCUMENTS

| | | |
|---|---|---|
| 4-151122 | 5/1992 | Japan . |
| 5-134248 | 5/1993 | Japan . |
| 5-216048 | 8/1993 | Japan . |
| 6-68589 | 8/1994 | Japan . |
| 7-270806 | 10/1995 | Japan . |

Primary Examiner—Hung Xuan Dang
Assistant Examiner—Tai V. Duong
Attorney, Agent, or Firm—Pillsbury Madison & Sutro LLP

[57] ABSTRACT

A liquid crystal display panel includes a first electrode substrate having a transparent electrode array, and a second electrode substrate having a second transparent electrode array which extends perpendicularly to the electrode array of the first substrate. The substrates overlap each other with separation walls interposed therebetween. The separation walls are formed in the spaces between individual transparent electrodes of one of the arrays and extend in parallel therewith. Liquid crystal, such as antiferroelectric liquid crystal, fills the space between the two electrode substrates. The liquid crystal near the separation walls is not properly oriented, and light leaks therethrough in the dark state of the liquid crystal. To prevent the light leakage, metal electrodes are formed along the separation walls so that the metal electrodes intercept the light passing through the liquid crystal near the separation walls. Thus, a high display contrast is realized.

12 Claims, 9 Drawing Sheets

LIQUID CRYSTAL DISPLAY PANEL

CROSS-REFERENCE TO RELATED APPLICATION

This application is based upon and claims benefit of priority of Japanese Patent Application No. Hei-8-276330, filed on Oct. 18, 1996.

BACKGROUND OF THE INVENTION

1. Field of the Invention

The present invention relates to a liquid crystal display panel having a high contrast, and more particularly, to a liquid crystal display panel in which smectic liquid crystal, such as antiferroelectric liquid crystal, is used.

2. Description of Related Art

A liquid crystal panel in which a first electrode panel and a second electrode panel are overlapped with separation walls interposed therebetween, and liquid crystal is fills in a space between the first and second electrode panels is known. Transparent electrode arrays are formed on both first and second electrode panels in a perpendicular relation with each other so that they form picture elements at their intersections together with the liquid crystal filled in the space. The separation walls are formed on one of the electrode panels in spaces separating each transparent electrode along the transparent array. The separation walls keep a cell gap between the first and second electrode panels constant without intercepting light going through the picture elements.

The separation walls are usually formed on a surface of an orientation layer on one of the electrode panels by a photo-lithography process. That is, a photo-resist material (for example, S1-400-25 made by Shipley Corp.) is coated by a spin coating method to form a photo-resist layer. The photo-resist layer is exposed to light through a photo-mask and then, developed with a development liquid containing an ingredient, such as sodium phosphate $Na_nH_3$ $nPO_4$, for about 30 seconds. Thus, parts of photo-resist layer corresponding to openings for picture elements are removed and the parts forming the separation walls are left. After development, the photo-resist layer is washed in pure water, and then baked. The residual sodium phosphate near of the separation walls, however, cannot be completely removed by the washing process. That is, some of the sodium phosphate is left over on the orientation layer near the of separation walls as a thin film residual. Because of the residual sodium phosphate film, the liquid crystal filing the space between the two electrode panels cannot directly contact the orientation layer near of the separation walls. This means that the liquid crystal located near the separation walls cannot be correctly orientated. The incorrectly oriented liquid crystal causes light leakage in a dark phase which results in a low display contrast.

SUMMARY OF THE INVENTION

The present invention has been made in view of the above-mentioned problem. An object of the present invention is to provide a liquid crystal display panel having a high contrast, and more particularly, to provide a liquid crystal display panel in which light leakage near the separation walls is prevented by intercepting light passing therethrough. The light leakage from a neighborhood of the separation wall in a dark state of the liquid crystal occurs between that the liquid crystal close to the separation walls is not properly oriented.

According to the present invention, a light intercepting layer is provided to intercept the light passing near the separation wall. The light intercepting layer is formed on either a first electrode substrate or a second electrode substrate. The light intercepting layer may be a metal electrode, which is formed in contact with part of an transparent electrode constituting picture elements. The metal electrode also contributes to decreasing electric resistance of the transparent electrode in addition to intercepting the light passing near the separation wall. The light intercepting layer may be made of an insulating material solely for intercepting the light. The light leakage near the separation wall is prevented by the light intercepting layer, and accordingly, the contrast of the display is greatly improved.

In addition to providing the light intercepting layer, the orientation layer may be made thicker in a region near the separation wall than in another region, so that the liquid crystal in the neighboring region is not driven by a level of the voltage which drives the liquid crystal in the other region. The display contrast is further improved because the liquid crystal in the neighboring region is inactivated by the thicker orientation layer in addition to the effect of the light intercepting layer. Further, the electric load of the display panel is decreased because the liquid crystal near the separation wall is inactive, and a higher display luminance is attained.

Further, the liquid crystal near the separation wall may be made inactive (not responsive to the applied voltage) by making an insulating layer formed underneath the orientation layer thicker in the region close to the separation wall, as compared with that in the other region. Alternatively, the insulating layer may be composed of two materials having different dielectric constants, i.e., a material having a lower dielectric constant is used in the region close to the separation wall, while a material having a higher dielectric constant is used in the other region so that the liquid crystal in the former region is not driven by a level of voltage which drives the liquid crystal in the latter region.

Other objects and features of the present invention will become more readily apparent from a better understanding of the preferred embodiments described below with reference to the following drawings.

DETAILED DESCRIPTION OF THE CURRENTLY PREFERRED EMBODIMENTS

Figure 1:
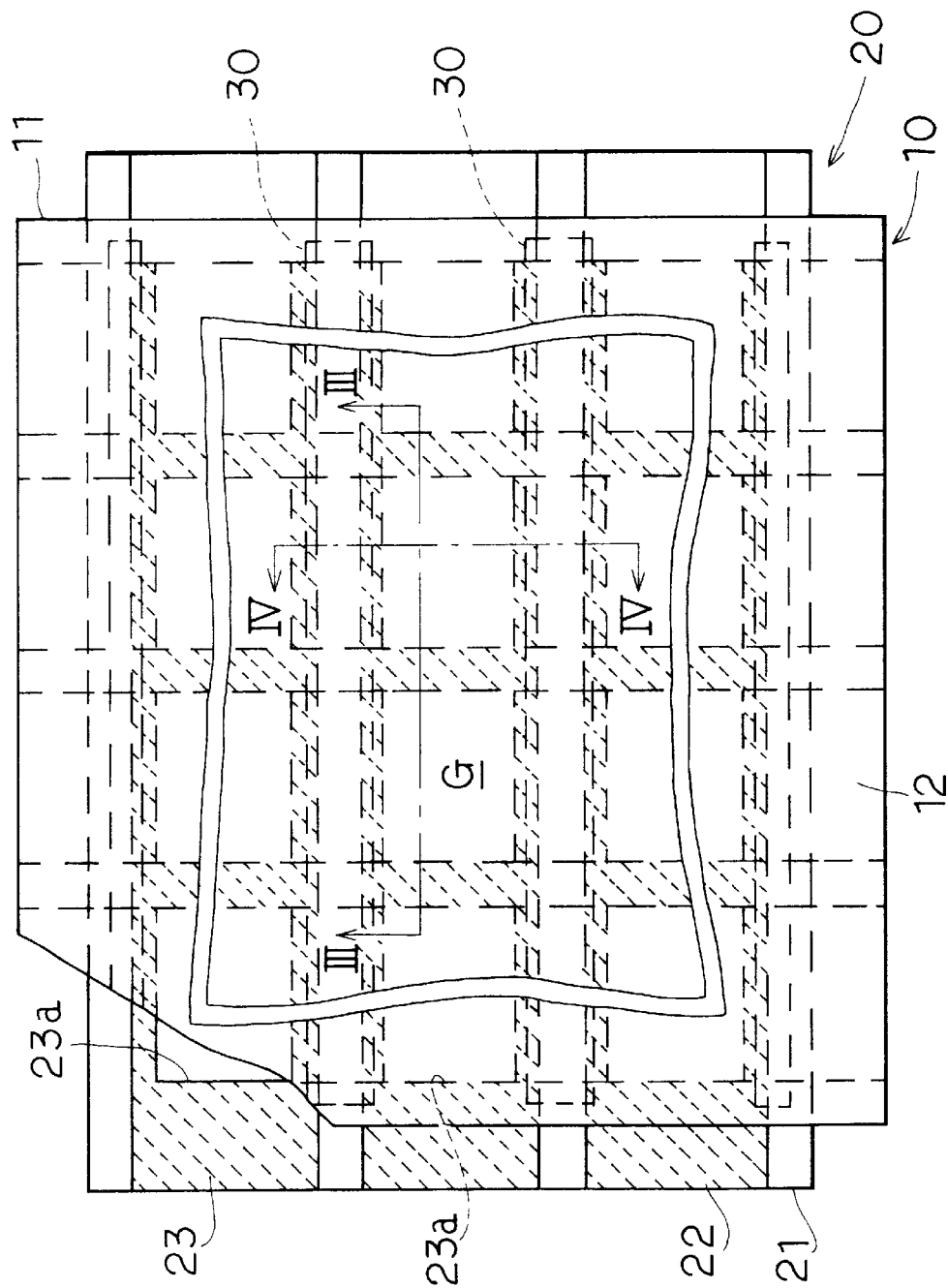
FIG. 1 is a plan view showing a liquid crystal display panel as a first embodiment according the present invention in which the size of the picture elements is enlarged.

Referring to FIGS. 1–4, a first embodiment according to the present invention will be described. FIG. 1 shows a plan view of a liquid crystal display panel in which a first and second electrode panels 10 and 20 are overlapped on each other with separation walls 30 and a seal (not shown in the drawing) interposed therebetween. A cell gap of about 1.5 $\mu$m is kept between the electrode panels 10 and 20 by the separation walls 30. Anti-ferroelectric liquid crystal 40 fills the space by a vacuum filling process.

Figure 2:
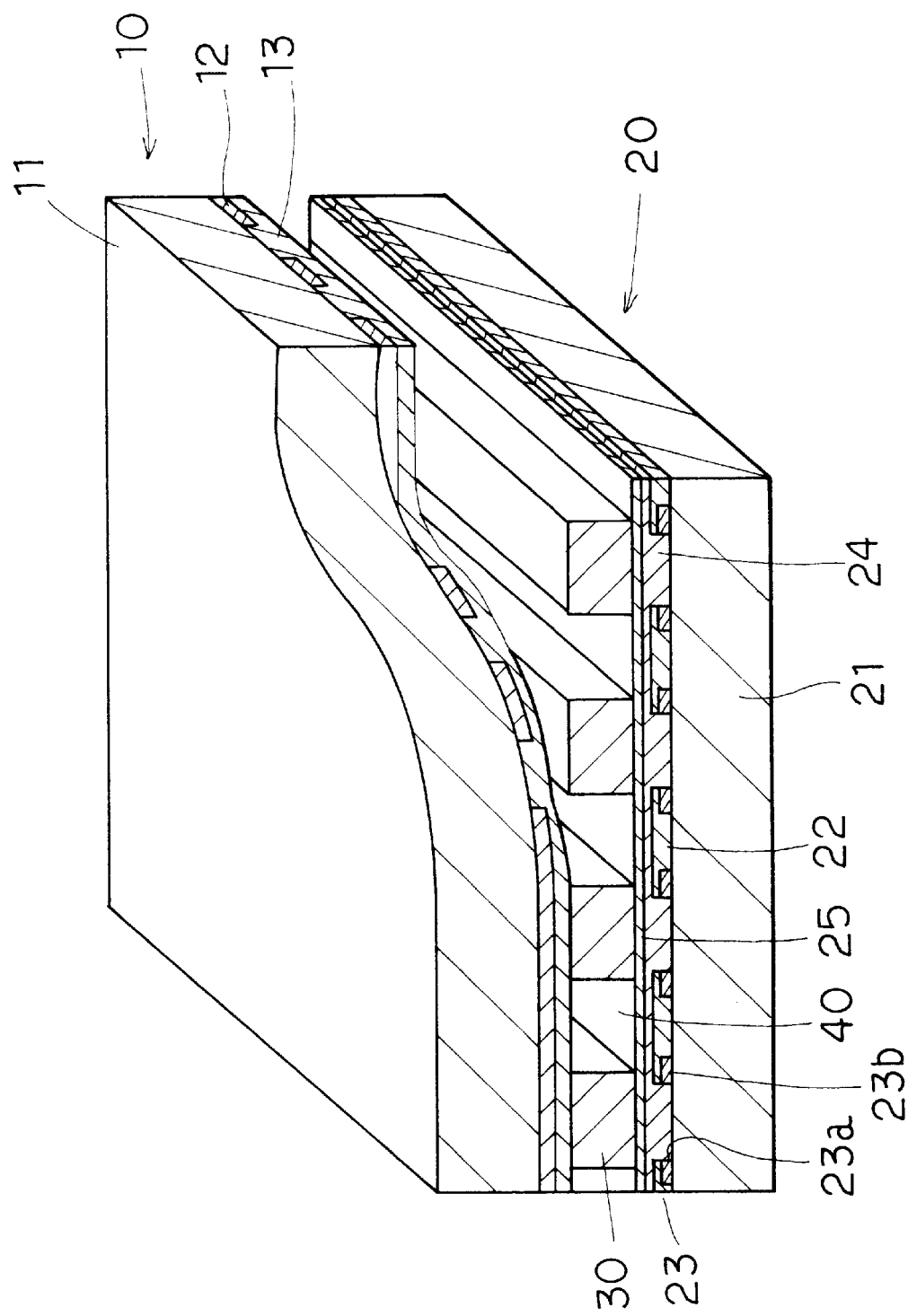
FIG. 2 is a perspective view showing a cross-sectional structure of the liquid crystal display panel shown in FIG. 1.
Figure 3:
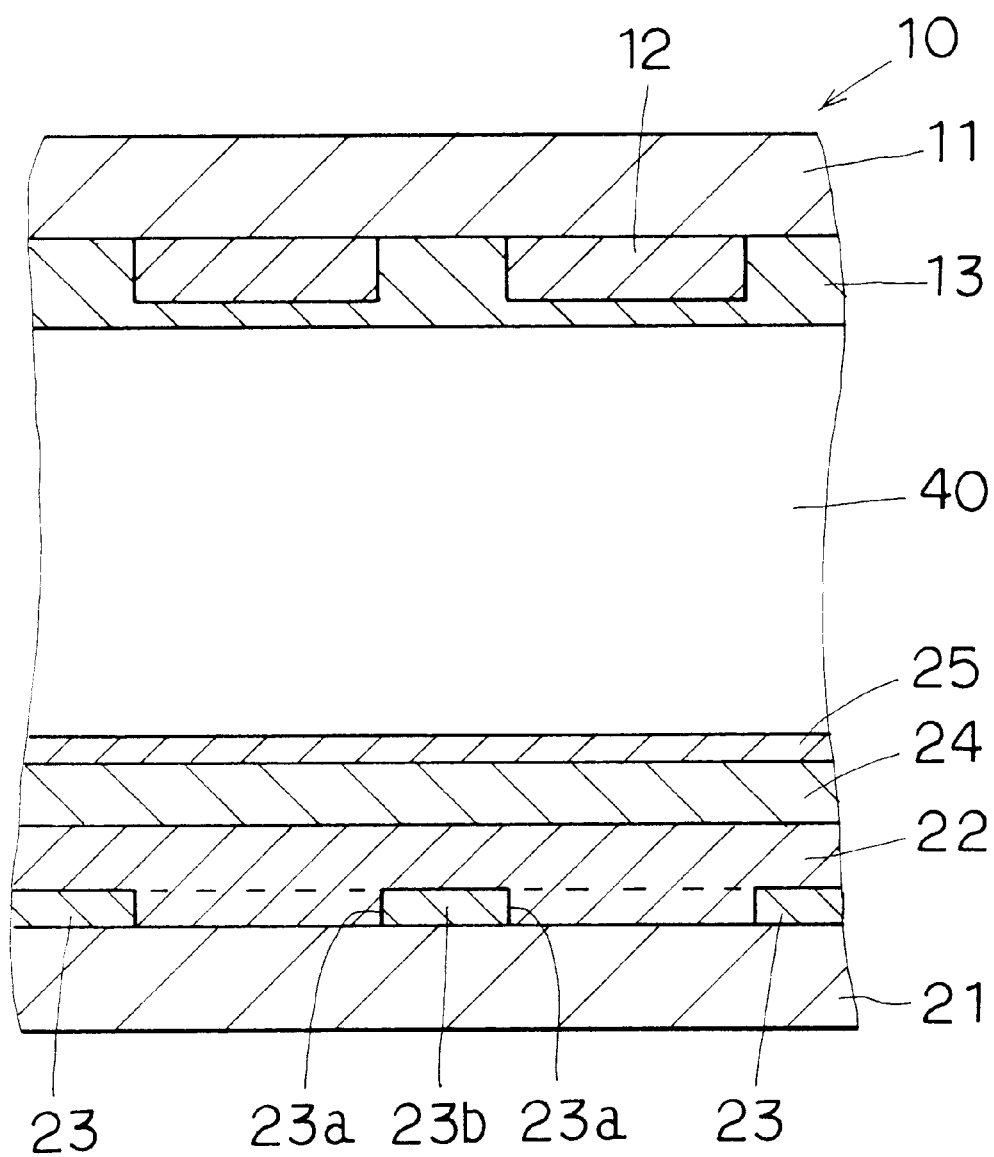
FIG. 3 is a cross-sectional view taken along a line III—III in FIG. 1.
Figure 4:
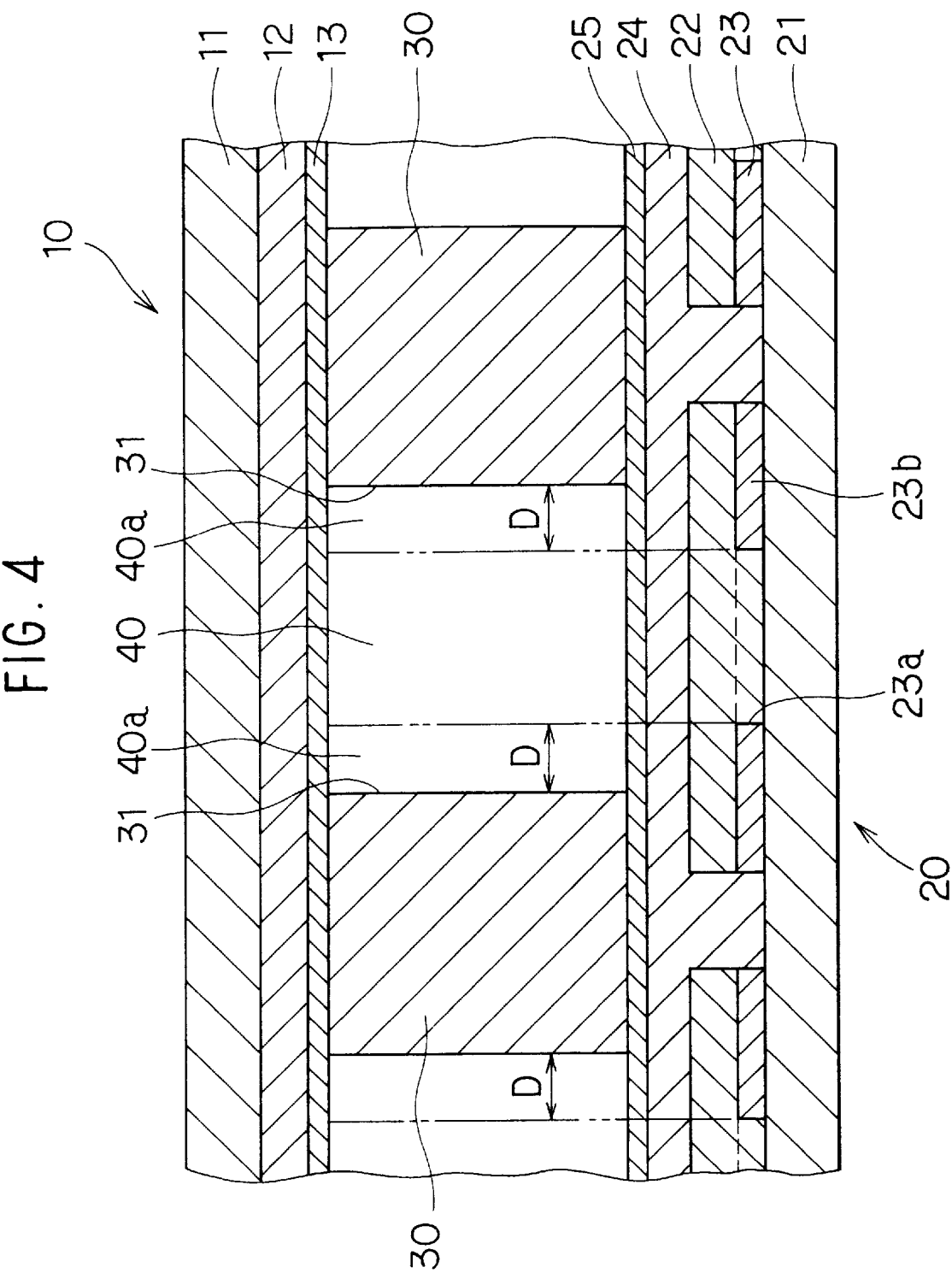
FIG. 4 is a cross-sectional view taken along a line IV—IV in FIG. 1.

As seen better in FIGS. 2–4, the first electrode panel 10 is composed of a transparent substrate 11, transparent electrodes 12 and an orientation layer 13. The transparent electrodes 12, made of a material, such as ITO, are formed on the transparent substrate 11 so that the transparent electrodes are parallel to each other in the vertical direction of FIG. 1. An orientation layer 13, made of a material, such as polyimide, for orientating the liquid crystal 40 is formed by offset printing both on the transparent substrate 10 and the transparent electrodes 12.

The second electrode panel 20 is composed of a transparent substrate 21, transparent electrodes 22, metal electrodes 23b, an insulating layer 24, and an orientation layer 25. The transparent electrodes 22, made of a material, such as ITO, are formed on the transparent substrate 21 so that each tranparent electrode extends parallel to each other in the horizontal direction of FIG. 1. An insulating layer 24, made of a material, such as tantalum oxide, is formed both on the transparent substrate 21 and the transparent electrodes 22. An orientation layer 25 made of a material, such as polyimide, is formed on the insulating layer 24 by off-set printing. When the first electrode panel 10 and the second electrode panel 20 overlap, both arrays of transparent electrodes 12 and 22 form a perpendicularly crossing matrix. As better seen in the FIG. 1, each intersection of the transparent electrodes 12 and 22 forms a picture element G together with liquid crystal 40 filling the space between the two electrode panels.

Metal electrodes 23b, made of a conductive material, such as aluminum, are formed on the transparent substrate 21 along both longitudinal sides of the transparent electrodes 22 in contact therewith. The metal electrodes 23b are also formed in spaces between the transparent electrodes 12 to connect metal electrodes 23b formed along both sides of picture elements G. The metal electrodes 23b formed along both sides of picture elements G are also connected at the left side of the second electrode panel 20, as shown in FIG. 1. The metal electrodes have a ladder shape, as shown in the hatched area with dotted lines in FIG. 1. In other words, the ladder-shaped electrode 23 includes metal electrodes 23b and openings 23a which constitute picture elements G. The horizontal width (in FIG. 1) of each opening 23a is equal to width the of the transparent electrode 12, and its vertical width is less than the width of the transparent electrode 22. As shown in FIGS. 2–4, the metal electrodes 23b are formed on the transparent substrate 21 and are, embedded in the transparent electrode 22.

The separation walls 30, made of a photo-resist material, are formed on the orientation layer 25 by the conventional process described above. That is, a photo-resist material (for example, S1-400-25 made by Shipley Corp.) is coated by a spin coating method to form a photo-resist layer. The photo-resist layer is exposed to light through a photo-mask and then developed with a development liquid containing an ingredient such as sodium phosphate $Na_nH_3$-$nPO_4$ for about 30 seconds. Thus, parts of photo-resist layer corresponding to openings for picture elements are removed and the parts forming the separation walls are left. After development, the photo-resist layer is washed in pure water, and then baked. The separation walls 30 are parallel to the transparent electrodes 22 and are formed on positions corresponding to the spaces between the transparent electrodes 22, partially overlapping the transparent electrodes, as shown in FIGS. 1 and 4. After the separation walls are formed, the orientation layer 25 is treated to give it a orientation function in a conventionally well known process.

The detailed positional relation of the separation walls 30, transparent electrodes 22, and the metal electrodes 23b is shown in FIG. 4. An edge of the metal electrode 23b, which forms the opening 23a, is located so that it extends to the picture element space G by a predetermined distance D measured from a surface 31 of the separation wall 30. The predetermined distance D is selected in a range of several $\mu$m to several tens $\mu$m. In this particular embodiment, it is about 3 $\mu$m. As explained above, a residual sodium phosphate film is left on the surface of the orientation layer 25, after the separation wall 30 is developed and washed, near the surface 31 of the separation wall 30. The distance D corresponds to an area where the residual sodium phosphate film is left on the orientation layer 25. The anti-ferroelectric liquid crystal 40a filling in the space corresponding to the distance D is not properly oriented because it does not directly contact the orientation layer 25, and some orientation force is also applied to the liquid crystal 40a from the separation walls. The anti-ferroelectric liquid crystal 40 filling in the space other than that space is correctly oriented because it directly contacts the orientation layer 25.

If there is a part of liquid crystal which is not properly oriented, light cannot be intercepted at that part, even when the liquid crystal is brought to the OFF state (the state in which light should be shut off). This means that a desired display contrast is not attained. In order to cope with this problem, the metal electrode 23b intercepting light going through the area D is provided according to the present invention. In other words, light going through the area D is intercepted by the metal electrode 23b. Therefore, the contrast of the display is not adversely affected by the improperly oriented liquid crystal.

Further, electric load in the display panel becomes much smaller in the present embodiment compared with a display panel which has no separation walls because the liquid crystal is not filling in the space where the separation walls exist. Accordingly, the voltage distortion occurring when spontaneous polarization of the liquid crystal is reversed also decreases in the panel having no separation walls. Therefore, the present embodiment is able to attain not only a high contrast, but also a high luminance. These advantages are further enhanced by the fact that the metal electrodes 23b decrease an electric resistance of the transparent electrodes 22 because the metal electrodes 23b are disposed electrically in contact with the transparent electrodes 22. The advantage due to the resistance decrease in the transparent electrodes 22 becomes greater as the size of the display panel becomes larger.

Figure 5:
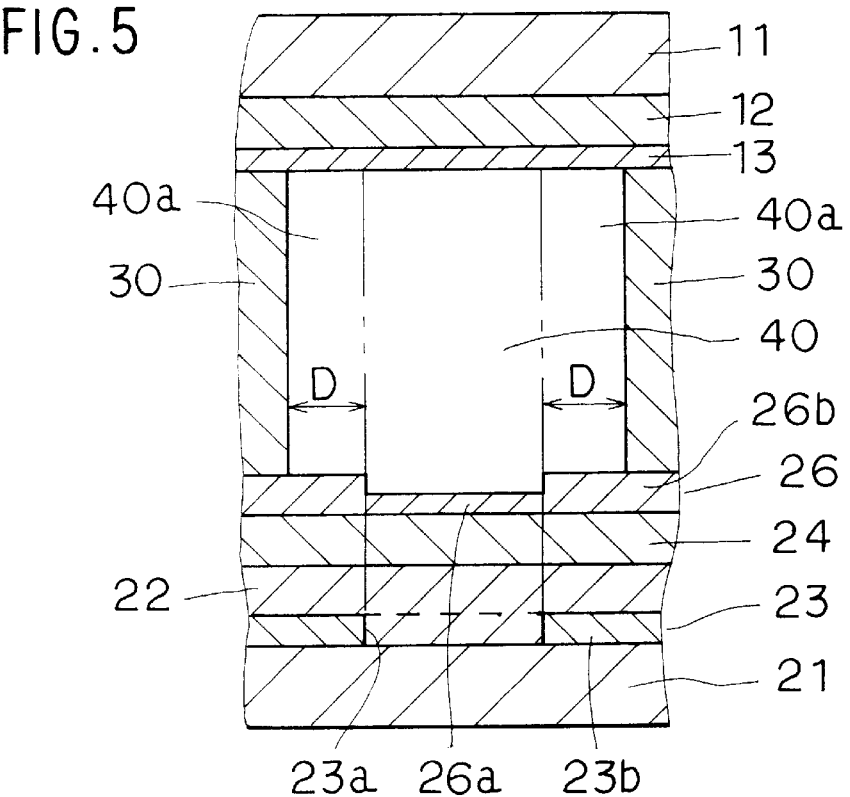
FIG. 5 is a cross-sectional view showing an essential portion of a second embodiment according to the present invention.
Figure 6:
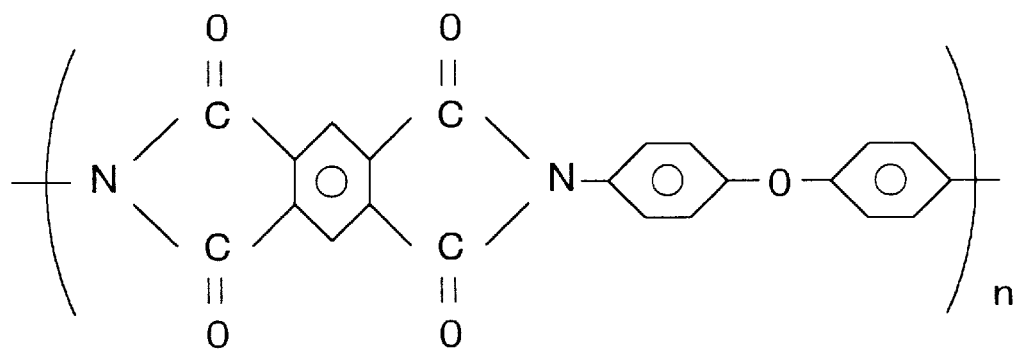
FIG. 6 shows a chemical structure of a material used as an orientation layer of the liquid crystal display panel shown in FIG. 5.
Figure 7:
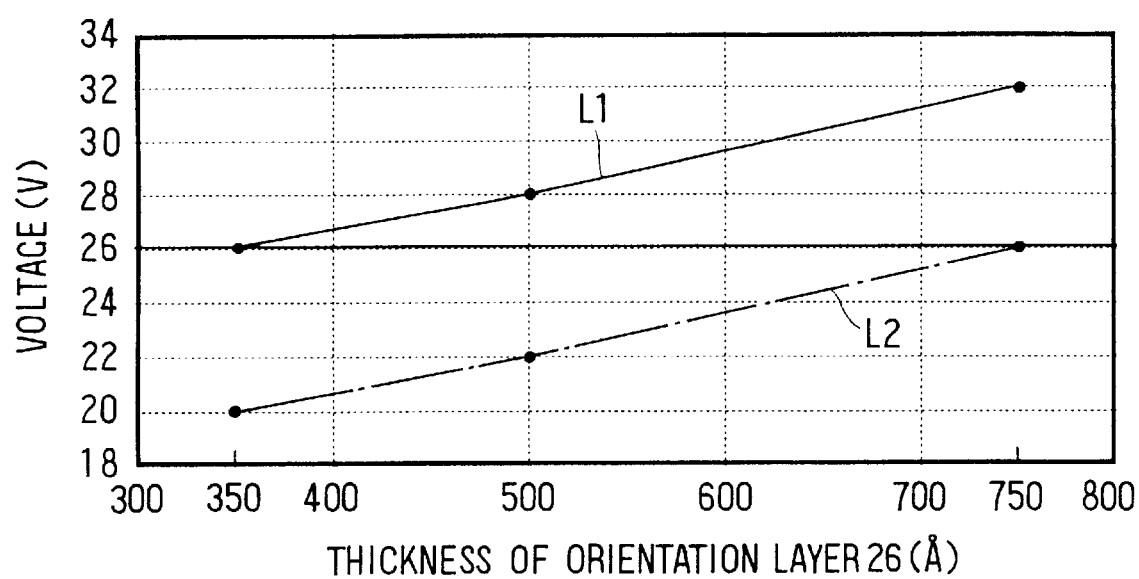
FIG. 7 is a graph showing a relation between a thickness of the orientation layer and an ON/OFF voltage applied to the panel shown in FIG. 5.

Referring to FIGS. 5, 6 and 7, a second embodiment of the present invention will be described. In the second embodiment, an orientation layer 26 is used in place of the orientation layer 25 of the first embodiment. The orientation layer 26 is composed of two portions. One is a portion 26b corresponding to the area D, and the other is a portion 26a corresponding to the opening 23a, as shown in FIG. 5. The portion 26a has the same thickness as the orientation layer 25 of the first embodiment, while the portion 26b is made thicker. The thickness of both portions 26a and 26b is selected so that the liquid crystal on the portion 26b, that is, the liquid crystal 40a in the area D, does not respond to the voltage to which the liquid crystal 40 on the portion 26a fully responds.

More particularly, the orientation layer 26 is made of a polyimide material having a chemical structure shown in FIG. 6. Each thickness of portions 26a and 26b is determined according to the results of experiments shown in FIG. 7. ON-voltage, which turns the liquid crystal to a bright state, and OFF-voltage, which turns it to a dark state are measured with respect to the various thickness of the orientation layer 26. In FIG. 7, a line L1 shows the ON-voltage and L2 the OFF-voltage. The graph in FIG. 7 shows that the ON-voltage is 26 V when the thickness of the orientation layer 26 is 350 Å, and that the liquid crystal is turned off with an OFF-voltage of 26 V when the thickness of the orientation layer 26 is 750 Å. This means that only the liquid crystal 40 corresponding to the opening 23a responds to the applied voltage if the thickness of the portion 26a is made 350 Å and that of the portion 26b is made 750 Å. In other words, the liquid crystal 40 can be driven without driving the liquid crystal 40a in the area D. Thus, the second embodiment further enhances the advantages of the first embodiment because the effect of the orientation layer 26 having two portions with different thickness which makes the liquid crystal in the area D inactive is added to the effects of the first embodiment. Incidentally, the insulating layer 24 of the second embodiment is made of tantalum oxide with a thickness of 1500 Å.

Figure 8:
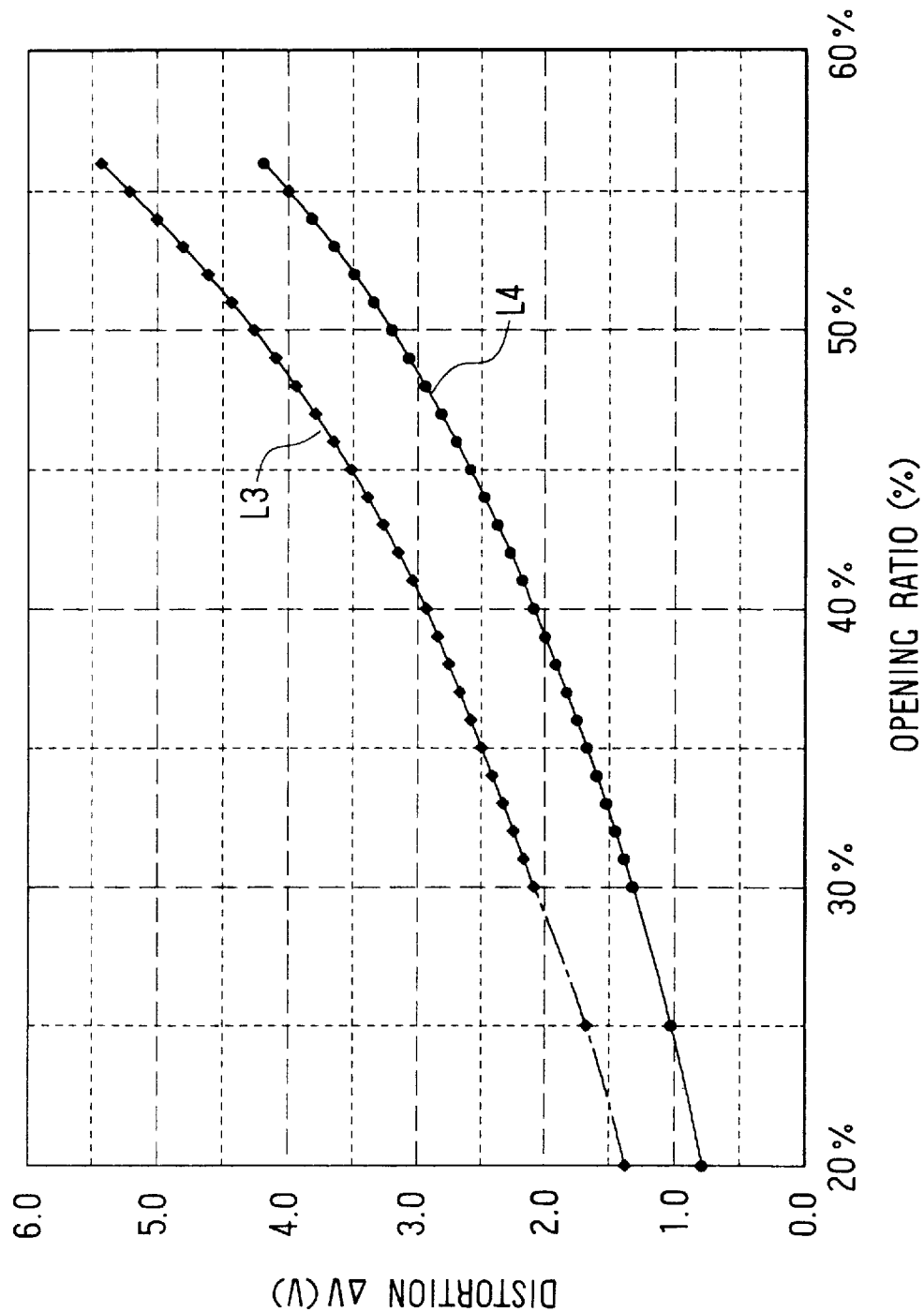
FIG. 8 is a graph showing a relation between an opening ratio of the panel and a distortion voltage $\Delta V$ both in the first and the second embodiments.

FIG. 8 shows a relation between an opening ratio (%) of the panel and the distortion voltage ($\Delta V$). The opening ratio means a ratio of a total area of the picture elements G (through which light passes) to a whole area of the display panel. The distortion voltage is the voltage difference between both ends of a transparent electrode 22 (left and right ends shown in FIG. 1), which appears when the spontaneous polarization of the liquid crystal is reversed. In FIG. 8, line L3 shows the voltage distortion $\Delta V$ in the display panel of the first embodiment, and line L4 shows the same in the second embodiment. It is seen from the graph that the distortion voltage in the second embodiment is smaller than that of the first embodiment for any opening ratio. This means that a higher opening ratio is attained in the second embodiment with the same distortion voltage, that is, a higher luminance can be attained in the second embodiment.

Figure 9:
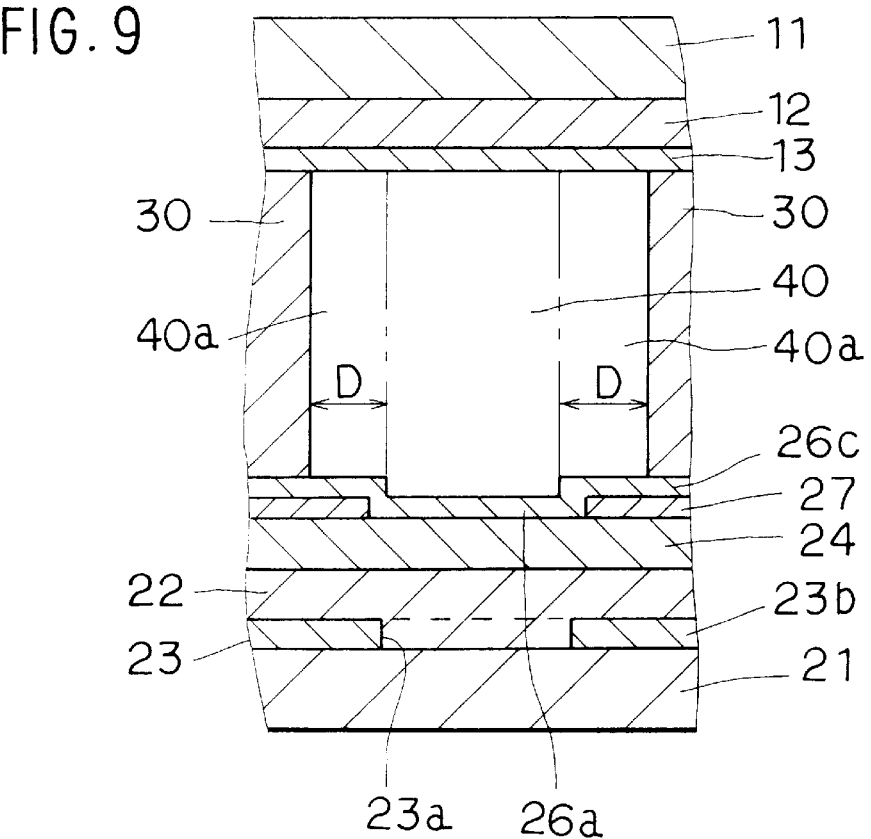
FIG. 9 is a cross-sectional view showing an essential portion of a first modification of the second embodiment.

FIG. 9 shows a modification of the second embodiment in which the orientation layer 26 of the second embodiment is replaced with an orientation layer 26c and an insulating layer 27. The orientation layer 26c is formed stepwise with a uniform thickness, and has the same thickness as the portion 26a of the second embodiment. The insulating layer 27 is formed underneath the orientation layer 26c, as shown in the drawing. The insulating layer 27 is made of a photo-sensitive and heat-resistant coating material of polyimide (for example, PI-400 Lithocoat made by Ube Industry).

Figure 10:
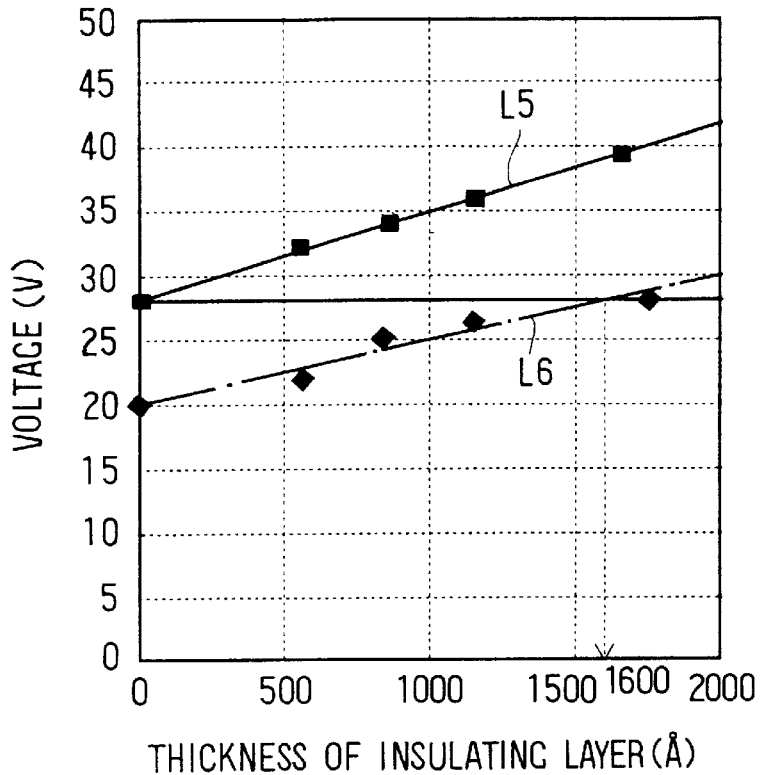
FIG. 10 is a graph showing a relation between a thickness of an insulating layer and an ON/OFF voltage applied to the panel shown in FIG. 9.

The thickness of the insulating layer 27 is selected so that the liquid crystal 40a in the area D does not respond to the voltage to which the liquid crystal 40 corresponding to the opening 23a fully responds. More particularly, the orientation layer 26c and 26a are made of a polyimide material having a chemical structure shown in FIG. 6, and the thickness of the insulating layer 27 is selected according to the results of experiments shown in FIG. 10. FIG. 10 shows ON- and OFF-voltages with respect to various thickness of the insulating layer 27 in the same manner as in the FIG. 7. In the graph of FIG. 10, line L5 shows the ON-voltage, and line L6 the OFF-voltage. From this graph, it becomes clear that only the liquid crystal 40 corresponding to the opening 23a responds to the applied voltage if the thickness of the insulating layer 27 is made 1600 Å. Thus, the modification of the second embodiment achieves the same function and advantage as the second embodiment. In this particular modification, the thickness of the orientation layer 26c and 26a is made 350 Å, the insulating layer 27 is made 1600 Å, and the insulating layer 24 is made of tantalum oxide with the thickness of 1500 Å. The orientation layers 26a and 26c in this embodiment are formed by a photo-lithography process in which the metal electrodes 23a are used as a photo-mask after the insulating layers 24 and 27 are formed on the transparent electrodes 22.

Figure 11:
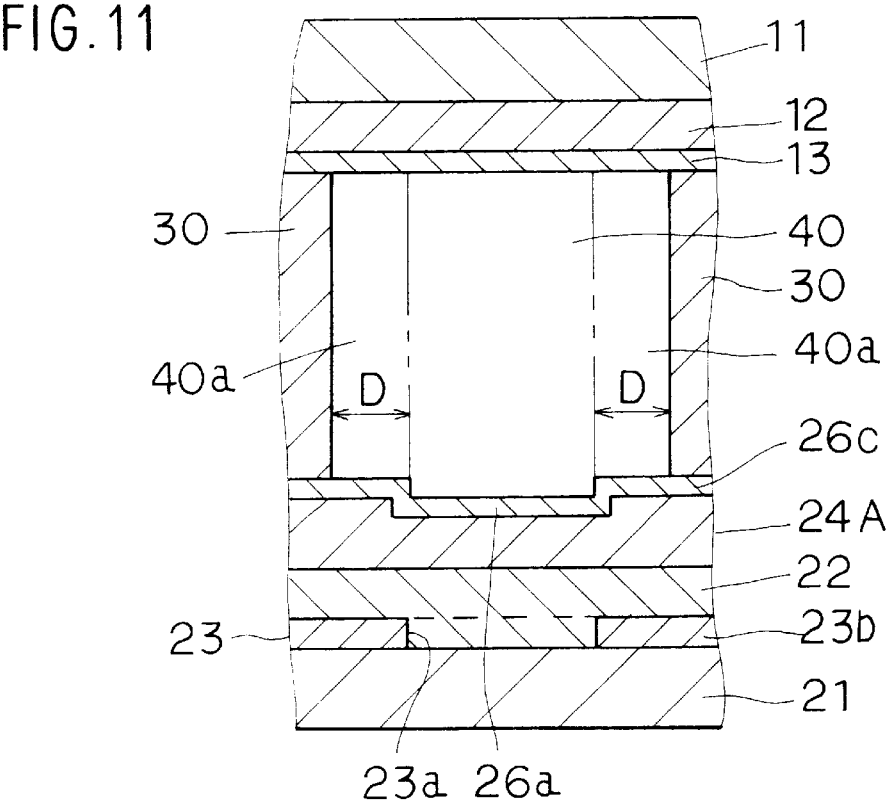
FIG. 11 is a cross-sectional view showing an essential portion of another modification of the second embodiment.

FIG. 11 shows another modification of the second embodiment in which the insulating layers 24 and 27 shown in FIG. 9 are replaced by a single insulating layer 24A. The second modification performs the same function and attains the same advantages as the first modification.

Figure 12:
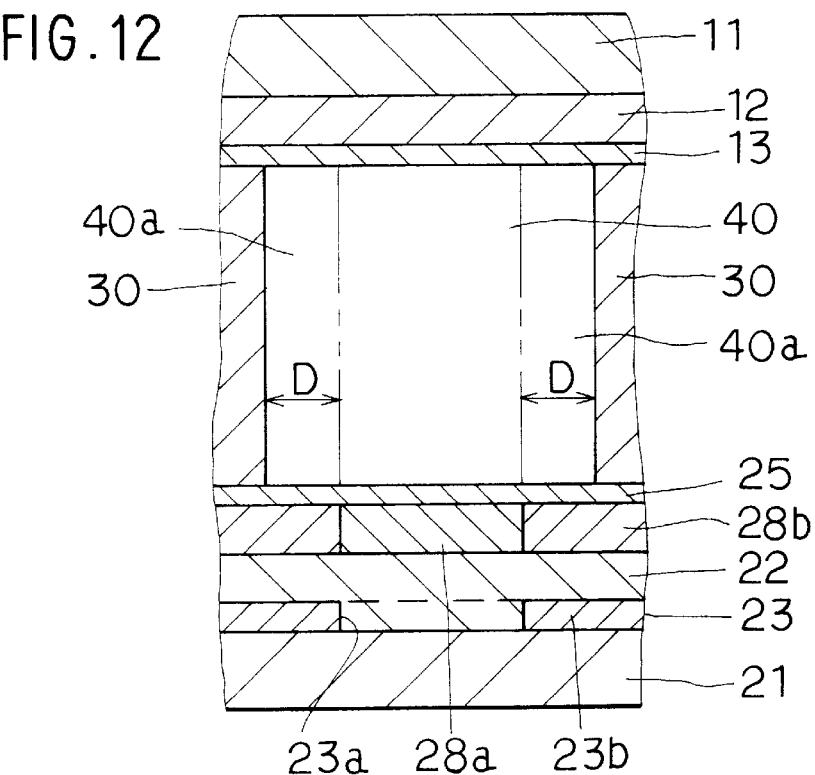
FIG. 12 is a cross-sectional view showing an essential portion of a third embodiment according to the present invention.

FIG. 12 shows a third embodiment according to the present invention in which the insulating layer 24 of the first embodiment shown in FIG. 4 is replaced with insulating layers 28a and 28b. The insulating layer 28a is made of a transparent insulating material, $Ta_2O_5$, and the insulating layer 28b is made of another transparent insulating material, $SiO_2$. The insulating layer 28a is formed on the transparent electrode 22 at a position corresponding to the opening 23a, while the insulating layer 28b is formed on the transparent electrode 22 at a position corresponding to the metal electrode 23b. The orientation layer 25 is formed on both of the insulating layers 28a and 28b. When the insulating layer 28a is made of a material having a dielectric constant $\in 1$ and the insulating layer 28b is made of a material having a dielectric constant $\in 2$, and there is a relation between both dielectric constants that $\in 1/\in 2 \geq 1.5$, only the liquid crystal corresponding to the opening 23a is responsive to the applied voltage while keeping the liquid crystal in the area D inactive. Thus, the electric load in the panel is decreased, and the same advantages as in the second embodiment can be attained in this third embodiment. If the value $\in 1/\in 2$ is made larger than 2, the advantage will be greater. Generally, the larger the value $\in 1/\in 2$ becomes, the higher its effect becomes.

Figure 13:
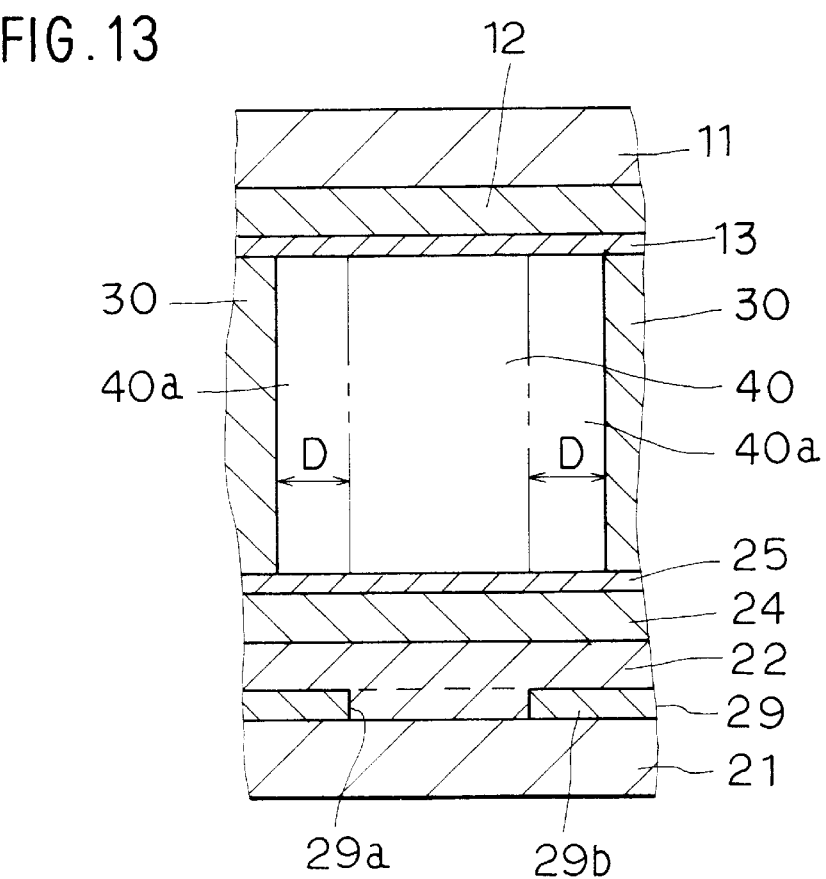
FIG. 13 is a cross-sectional view showing an essential portion of a fourth embodiment according to the present invention.

FIG. 13 shows a fourth embodiment according to the present invention in which the metal electrode 23b of the first embodiment shown in FIG. 4 is replaced with a black mask 29b. Openings 29a of the black mask 29b correspond to the openings 23a in the foregoing embodiments. Light is intercepted by the black mask 29b in the same manner as in the first embodiment. However, as composed to the first embodiment, the electric resistance of the transparent electrodes 22 cannot be decreased by the black mask 29b because it is made of an insulating material. Though the black mask 29b is disposed in the second electrode panel 20 in this embodiment, it may be disposed in the first electrode panel 10.

Though the anti-ferroelectric liquid crystal is used in the foregoing embodiments, some other liquid crystal, such as smectic liquid crystal, including ferro-electric liquid crystal or nematic liquid crystal, may be used. The metal electrode 23b may be formed between the transparent electrode 22 and the insulating layer 24 so that it electrically contacts the transparent electrode 22. Also, the shape of the metal electrode is not limited to the ladder shape as exemplified in the foregoing embodiments. For example, the portions connecting both sides made in the spaces between the transparent electrodes 12 (refer to the hatched area with dotted lines in FIG. 1) may be eliminated.

Further, the separation walls 30 formed in the spaces between the transparent electrodes 22 along therewith in the foregoing embodiments may have a different shape. For example, the separation wall may have a hollow rectangular shape to encircle each picture element G. In this case, the metal electrode 23b is formed underneath the separation wall so that it extends into the space corresponding to the picture element G by the distance D. Also, in this case, the first and second electrode panels 10 and 20 have to overlap each other after the liquid crystal fills each space defined by the separation wall.

Further, the distance D described above may be modified so that it also covers an area on the orientation layer 25 on which the photo-resist material may be left over after the development and washing processes of the separation wall 30. Though the sodium phosphate liquid is used for developing the separation wall 30, it may be replaced with any other equivalent liquid. Also, the separation wall 30 may be formed in the spaces between the transparent electrodes 22 not to overlap therewith, though the separation wall 30 in the foregoing embodiments is formed to overlap partially with the transparent electrode as shown in FIG. 1. In this case, too, the light passing through the liquid crystal in the neighborhood of the separation wall which is not properly oriented can be intercepted by the metal electrode 23b or the black mask 29b.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A liquid crystal display panel, comprising:

a first electrode substrate having a plurality of transparent electrodes extending in parallel with each other;

a second electrode substrate having a plurality of transparent electrodes extending in parallel with each other and perpendicularly to the transparent electrodes of the first electrode substrate so that picture elements are formed at each cross-over point of the transparent electrodes of both first and second electrode substrates;

separation walls, made of an electric insulation material, disposed between the first and the second electrode substrates, forming spaces at positions corresponding to the picture elements so that light passes through the picture elements;

liquid crystal filled in the spaces; and a light intercepting layer, formed on one of the first and the second electrode substrates, for intercepting light passing through the picture elements at a neighborhood of the separation walls, wherein liquid crystal located in a first region where light passing through the picture elements is not intercepted by the light intercepting layer is driven by a lower voltage than the liquid crystal located in a second region where light is intercepted by the light intercepting layer is driven.

2. The liquid crystal display panel as in claim 1, further comprising:

an insulator formed as an electric insulation layer on the transparent electrodes of the electrode substrate on which the light intercepting layer is formed, the insulator facing the liquid crystal, wherein a thickness of the insulator corresponding to the second region is thicker than that of the insulator corresponding to the first region.

3. The liquid crystal display panel as in claim 2, wherein the insulator includes an orientation layer facing the liquid crystal; and the orientation layer makes the insulator corresponding to the second region thicker than that corresponding to the first region.

4. The liquid crystal display panel as in claim 2, wherein the insulator is composed of an orientation layer and an insulating layer; and the orientation layer is formed on the insulation layer to face the liquid crystal.

5. The liquid crystal display panel as in claim 1, further comprising:

insulator formed as an electric insulation layer on the transparent electrodes of the electrode substrate on which the light intercepting layer is formed, the insulator facing the liquid crystal, wherein the insulator is composed of an orientation layer and an insulating layer;

the orientation layer is formed on the insulation layer to face the liquid crystal;

a dielectric constant of the insulation layer corresponding to the first region is higher than that corresponding to the second region.

6. A liquid crystal display panel, comprising:

a first electrode substrate having a plurality of transparent electrodes that extend parallel to each other;

a second electrode substrate having a plurality of transparent electrodes that extend parallel to each other and perpendicularly to the transparent electrodes of the first electrode substrate so that picture elements are formed at each cross-over point of the transparent electrodes of the first and second electrode substrates;

a plurality of separation walls, each separation wall comprised of an electric insulation material, the separation walls disposed between the first and the second electrode substrates, the separation walls forming the separation walls forming spaces at positions corresponding to the picture elements so that light passes through the picture elements, the separation walls are disposed along and between the transparent electrodes of one of the first and the second electrode substrates;

liquid crystal filling the spaces;

a light intercepting layer formed on one of the first and the second electrode substrates, the light intercepting layer intercepting light passing through the picture elements near the separation walls;

an orientation layer formed on an inner surface of one of the first and the second electrode substrates, the orientation layer facing the space filled with the liquid crystal; and a thickness of the orientation layer corresponding to a region in the picture elements where light is intercepted by the light intercepting layer is made thicker than that of another region with a predetermined thickness ratio so that the liquid crystal in the light intercepted region is not driven by a voltage which drives the liquid crystal in the region of the picture elements.

7. The liquid crystal display panel according to claim 6, wherein the predetermined thickness ratio is larger than 1.5.

8. A liquid crystal display panel, comprising:

a first electrode substrate having a plurality of transparent electrodes that extend parallel to each other;

a second electrode substrate having a plurality of transparent electrodes that extend parallel to each other and perpendicularly to the transparent electrodes of the first electrode substrate so that picture elements are formed at each cross-over point of the transparent electrodes of the first and second electrode substrates;

a plurality of separation walls, each separation wall comprised of an electric insulation material, the separation walls disposed between the first and the second electrode substrates, the separation walls forming the separation walls forming spaces at positions corresponding to the picture elements so that light passes through the picture elements, the separation walls are disposed along and between the transparent electrodes of one of the first and the second electrode substrates;

liquid crystal filling the spaces;

a light intercepting layer formed on one of the first and the second electrode substrates, the light intercepting layer intercepting light passing through the picture elements near the separation walls;

an orientation layer formed on an inner surface of one of the first and the second electrode substrates, the orientation layer facing the space filled with liquid crystal; and an insulating layer formed between the orientation layer and the transparent electrodes, wherein a thickness of the insulating layer corresponding to a region in the picture elements where light is intercepted by the light intercepting layer is made thicker than that of another region with a predetermined thickness ratio so that the liquid crystal in the light intercepted region is not driven by a voltage which drives the liquid crystal in the region of the picture elements.

9. The liquid crystal display panel according to claim 8, wherein portions of the insulating layer having a thicker thickness are formed by laminating a plurality of electric insulation materials.

10. The liquid crystal display panel according to claim 8, wherein the predetermined thickness ratio is larger than 1.5.

11. A liquid crystal display panel, comprising:

a first electrode substrate having a plurality of transparent electrodes that extend parallel to each other;

a second electrode substrate having a plurality of transparent electrodes that extend parallel to each other and perpendicularly to the transparent electrodes of the first electrode substrate so that picture elements are formed at each cross-over point of the transparent electrodes of the first and second electrode substrates;

a plurality of separation walls, each separation wall comprised of an electric insulation material, the separation walls disposed between the first and the second electrode substrates, the separation walls forming the separation walls forming spaces at positions corresponding to the picture elements so that light passes through the picture elements, the separation walls are disposed along and between the transparent electrodes of one of the first and the second electrode substrates;

liquid crystal filling the spaces;

a light intercepting layer formed on one of the first and the second electrode substrates, the light intercepting layer intercepting light passing through the picture elements near the separation walls;

an orientation layer formed on an inner surface of one of the first and the second electrode substrates, the orientation layer facing the space filled with the liquid crystal; and an insulating layer formed between the orientation layer and the transparent electrodes, wherein the insulating layer corresponding to a region in the picture elements where light is intercepted by the light intercepting layer is made of a first insulating material, and the insulating layer corresponding to another region is made of a second insulating material, a dielectric constant of the second insulating material being higher than that of the first insulating material by a predetermined dielectric constant ratio so that the liquid crystal in the light intercepted region is not driven by a voltage which drives the liquid crystal in the region of the picture elements.

12. The liquid crystal display panel according to claim 11, wherein the predetermined dielectric constant ratio is larger than 1.5.

* * * * *